Patented Apr. 5, 1932

1,852,345

UNITED STATES PATENT OFFICE

HARRY L. FISHER, OF AKRON, OHIO, ASSIGNOR TO THE B. F. GOODRICH COMPANY, OF NEW YORK, N. Y., A CORPORATION OF NEW YORK

RUBBER CONVERSION PRODUCTS AND METHOD OF MAKING SAME

No Drawing.   Application filed December 28, 1926.   Serial No. 157,620.

This invention relates to rubber conversion products and has for an object to provide compositions of the above indicated character, and also to provide an improved process for the manufacture from rubber of these conversion products.

Certain methods of preparing conversion products from rubber have been described in my Patent No. 1,605,180 of November 2, 1926, which methods include the mixing directly into a mass of crude rubber of an organic sulfonyl chloride or an organic-sulfonic acid, and heating the mix sufficiently to produce an exothermal reaction within the mass. By the process of this prior application, products having the same empirical formula as rubber and a less chemical unsaturation than rubber, and therein termed isomers of rubber, have been produced.

I now find that conversion products which are very similar to the rubber isomers of the aforesaid application may be prepared by treating rubber dissolved in an organic solvent with any of the above mentioned types of organic reagents. The process according to the present invention is carried out by admixing an organic sulfonyl chloride or an organic sulfonic acid into a solution of rubber, either with or without phenol added to the admixture, and heating the mixture at the boiling temperature of the solvent for an extended period of time. The heating may preferably be accomplished on a steam bath and under reflux to prevent loss of solvent. When the reaction in solution has been completed, substantially all the solvent and the phenol, where used, may be recovered by distillation, leaving a solid residuum which comprises the desired conversion product. It has been found that the yield of the solid conversion product is quantitative, that is, practically the same amount by weight of the conversion product is obtained as that of the original rubber employed. The character of the reaction has not been ascertained, although there is some indication that the organic acid reagent acts somewhat in a catalytic capacity. The residual acid in the final product may be removed by washing or it may be neutralized by means of a weak alkali. The converison products prepared in accordance with the present invention has been found to be more or less soluble in the common rubber solvents, such as benzene, gasoline, turpentine, chloroform, carbon tetrachloride, carbon disulfide, etc., generally giving colloidal solutions of lower viscosity than similar solutions of rubber, and to be practically insoluble in alcohol, ether, acetone, aniline, water, dilute acids and alkalies.

In order to illustrate the above process in greater detail, the following examples are given below.

*Example 1*

Take 100 parts by weight of rubber dissolved in benzene, for example, to make a 5 to 10 percent rubber solution and add thereto 7.5 parts by weight of p-phenol sulfonic acid. The mixture is placed in a suitable receptacle, arranged under reflux, if desired, in order to return to the solution any of the solvent which may be distilled off during the process. The mixed rubber and acid is then subjected to heating, for example on a steam bath, so that the liquid in the receptacle is maintained at approximately its boiling temperature, and the heating continued for two days, or for such times as to insure the completion of the reaction. At the end of the heating period, the reaction mixture is subjected to distillation until substantially all the solvent has been driven off leaving a residue comprising the solid conversion product.

Products formed in accordance with the above example have been found to have chemical and physical properties corresponding substantially to those enumerated hereinabove.

The above conversion product is preferably prepared or reworked for industrial purposes by a thorough homogenization of the mass, either by comminution or by mastication or by resolution in an organic solvent, and it is preferably washed free of residual acid and other water soluble impurities during or after the homogenizing process and in this condition forms a raw material adapted for a wide variety of industrial uses. If the conversion product is to be used in solution, however, the liquid reaction mixture may in some cases be directly employed and where so employed it is generally desirable to remove the residual acid by washing or to neutralize the residual acid by treating with an alkali.

It will be understood that the above described process may be modified in various ways; such for example as in the proportions of the ingredients employed, in the time and temperature of heating, and in the use in the initial rubber solutions of other organic solvents, carbon tetrachloride, gasoline, etc., also being operable. The p-phenol sulfonic acid may also be replaced by other sulfonic acids, such as p-toluene sulfonic acid, β-naphthalene sulfonic acid, ethyl sulfonic acid and the like.

Example 2

As a further illustration of the preparation of the conversion products, I take 100 parts by weight of rubber dissolved in benzol, preferably in a 5 to 10 percent rubber solution, and add thereto 5 parts of phenol sulfonic acid and 100 parts of phenol. The mixture is heated on a steam bath for from 40 to 48 hours, the heating taking place under reflux to prevent loss of solvent as in the previous example. After removing the solvent and phenol by distillation and the acid by washing with water, the resulting product is a tough, non-grindable solid which is readily thermoplastic at relatively low temperatures, and which has generally the chemical properties as to constitution and unsaturation and the physical properties as to solubility described hereinabove.

In comparing the product of Examples 1 and 2, both are found to be very similar and differ principally in that the products made in the presence of phenol generally have somewhat lower softening temperatures. What part the phenol takes in this reaction is not known, but tests seem to indicate that it cooperates with the sulfonic acid in the manner of a catalyst to facilitate the conversion or isomerization of the rubber, the reaction being more readily accomplished where phenol is present.

Organic sulfonyl chlorides may be also employed in the above examples, but our experiments have indicated that where phenol is not employed the conversion products prepared with sulfonyl chlorides are difficultly soluble in rubber solvents and practically non-thermoplastic. Such products are not known to have any practical importance at the present time. Rubber conversion products having the desirable properties of the products of Examples 1 and 2, namely, solubility in organic solvents and remoldability, may however be prepared by the cooperative reaction of phenol and an organic sulfonyl chloride with rubber in solution, as is illustrated in the following example.

Example 3

To 100 parts by weight of a 5 percent rubber solution in benzol add 20 parts of phenol and 5 parts of p-toluene sulfonyl chloride, thoroughly admixing the ingredients. Place the admixture on a steam bath, preferably under reflux, and heat for approximately 2 days to ensure completion of the conversion reaction. The conversion product, when isolated from the reaction mixture, is soluble in organic solvents, readily heat-plastic and possesses in general the chemical and physical properties of the products hereinabove described.

It is to be understood that phenols other than phenol itself may be employed in these processes of the above Examples 2 and 3, and that although the latter has been found to be preferable, cresol, carvacrol, α-naphthol, β-naphthol, catechol and p-chloro-phenol may also be employed. The conversion products herein described are vulcanizable with sulfur, as by incorporating the sulfur into the conversion product and subsequently heating to vulcanizing temperatures.

Example 4

Where the proportions of the sulfonic acid or the sulfonyl chloride to rubber specified in the above examples are materially increased, the softening temperatures of the conversion products become higher. Products may be made which are not in any practical sense thermoplastic and yet may be useful in solution as coating materials. Thus, when the reaction of Example 1 is carried out with 20, 40 or 100 parts of p-toluene sulfonic acid, the conversion product is a practically non-thermoplastic material but at the same time is readily soluble in the common rubber solvents.

I have also found that balata, gutta percha, synthetic rubbers, such as the so-called methyl rubbers, and reclaimed rubbers which contain only minor proportions of fillers and pigments may be converted by the above described processes into plastic products having properties of the order hereinabove described with respect to the rubber conversion products. Reclaims and vulcanized scrap rubbers containing high percentages of pigments have been found not to be particularly satisfactory, principally because of the reaction between the pigments and the reagent during the conversion reaction, and even where the pigments are inert they are found to retard the conversion of the rubber. The term "rubber" is employed in the appended claims in a generic sense to include crude and vulcanized rubbers, synthetic rubbers and rubber-like substances of the character herein referred to.

The soluble conversion products of this application are particularly adapted for use as coating materials, when dissolved in organic solvents. Where it is desired to use these heat-plastic compositions for this purpose, I may take the intermediate liquid product resulting from heating the rubber solution with the organic acid and without removing either the solvent or the acid employ this intermediate liquid product directly for coating purposes. It is desirable in many instances, however, to remove the acid because of its corrosive effects upon metals and I preferably accomplish this by washing the intermediate liquid product with water one or more times to dissolve out the acid constituent. Alternatively, the acid may be neutralized by adding thereto a weak alkali, as by running ammonia gas through the intermediate liquid product.

While the procedure of the specific examples above given calls for the rubber to be first dissolved in an organic solvent, I find that the reaction may be equally well effected by admixing the rubber, preferably in small pieces, with the solvent, the phenol and the acid reagent. Upon heating, the rubber goes into solution, the phenol apparently assisting in the dissolving of the rubber.

Where difficultly soluble rubbers are employed, such as vulcanized rubber, reclaimed rubber, etc., this method of procedure has been found to be highly advantageous.

The specific examples hereinabove are given merely by way of illustrating preferred embodiments of my invention and it will be understood that a wide range of variations and modifications in the proportions of ingredients, the time and temperatures of heating and the preparation of the reaction products for industrial uses may be employed without departing from the principles of this invention.

I claim:

1. The herein described method which comprises admixing an organic sulfonic acid into rubber in solution and heating the mixture.

2. The herein described method which comprises admixing an organic sulfonic acid into rubber in solution, and subjecting the admixture to heating for such time and at such temperature as to convert the rubber into a readily heat-plastic composition.

3. The herein described method which comprises admixing rubber in solution with an organic sulfonic acid and maintaining the mixture at approximately the boiling point of the solvent until the rubber is converted to a heat-plastic composition.

4. The herein described method which comprises forming an admixture of rubber in solution with an organic sulfonic acid and heating the admixture under reflux.

5. The herein described method which comprises admixing rubber in solution with phenol and with a substance chosen from a class consisting of organic sulfonic acids and organic sulfonyl chlorides and heating the mixture.

6. The herein described method set forth in claim 1 in which the reaction product is rendered non-acid in character.

7. The herein described method as set forth in claim 1 in which the product of the reaction is rendered non-acid in character by neutralization of its acid content.

8. The herein described method which comprises admixing rubber in solution with phenol and a substance chosen from a class consisting of organic sulfonic acids and organic sulfonyl chlorides, maintaining the admixture at approximately the boiling temperature of the solvent until the rubber is converted to a heat-plastic composition, and thereafter recovering from the reaction mixture the solid heat-plastic conversion product of the rubber.

9. The herein described method as set forth in claim 8 in which the conversion product is homogenized.

10. The herein described method as set forth in claim 8 in which the conversion product is homogenized and rendered non-acid in character.

11. A composition of matter comprising the product of the reaction, under the influence of heat and in the presence of a phenol, of rubber and an organic sulfonic acid.

12. A composition of matter comprising the product of the reaction, under the influence of heat and in the presence of phenol, of rubber and a substance selected from a group consisting of organic sulfonic acids and organic sulfonyl chlorides.

13. The herein described method which comprises admixing rubber, a rubber solvent, a phenol and a substance selected from a class consisting of sulfonic acids and sulfonyl chlorides containing a cyclic or ring grouping, and heating the admixture.

14. The herein described method which comprises admixing rubber, a rubber solvent and an organic sulfonic acid containing a cyclic or ring grouping, and heating the admixture.

15. The herein described method which comprises admixing rubber, a rubber solvent and a phenol sulfonic acid, and heating the admixture.

16. The herein described method which comprises admixing rubber, a rubber solvent, and an aromatic sulfonic acid, and heating the admixture.

17. The herein described method which comprises admixing rubber in solution with a phenol and an aromatic sulfonic acid, and heating the admixture to convert the rubber to a heat-plastic composition.

18. The herein described method which comprises admixing rubber, a rubber solvent, and p-toluene sulfonic acid, and heating the admixture.

19. The herein described method which comprises admixing rubber in solution, a phenol, and an aromatic sulfonyl chloride, and heating the admixture.

20. The herein described method which comprises admixing rubber in solution with phenol and p-toluene sulfonyl chloride and heating the admixture to convert the rubber to a heat-plastic composition.

In witness whereof I have hereunto set my hand this 20th day of November, 1926.

HARRY L. FISHER.